Patented May 17, 1932

1,858,820

UNITED STATES PATENT OFFICE

ROBERT DOUGLAS, OF ROCHESTER, NEW YORK, ASSIGNOR, BY MESNE ASSIGNMENTS, TO GENERAL FOODS CORPORATION, OF NEW YORK, N. Y., A CORPORATION OF DELAWARE

PROCESS OF PREPARING PECTIN

No Drawing.   Application filed August 25, 1925.   Serial No. 52,460.

My invention relates to jellifying substances and more particularly dry pectin obtained by alcohol precipitation, and to methods of preparing the same from fruits, the chief object being to provide a practical and efficient method of preparing pectin on a commercial scale in a more pure and convenient state, especially as regards the presence of starch.

To these and other ends the invention resides in certain improvements and method steps, all as will be hereinafter more fully described, the novel features being pointed out in the claims at the end of the specification.

Apples, quinces and like fruits at the stage of ripeness best suited for the manufacture of pectin contain starch as well as pectin. The starch is present in a form which is insoluble in the cold juice. The pectin mainly present in the form of its "mother substance," called protopectin or pectose, is likewise insoluble in the juice.

The pectin is obtained in solution by known means and by reason of the cooking which the raw material undergoes, the pectin extract containing starch in soluble or dispersed form as well as pectin.

Present in the pectin solution besides pectin and starch are other constituents derived from the raw material. These other constituents are more or less completely soluble in water and alcohol, while the starch is completely precipitated by alcohol of a proper concentration suitable for precipitation of the pectin.

By adding the pectin solution to one or more volumes of alcohol, the pectin and starch may be precipitated and the precipitate can then be pressed or filtered free from the mother liquor. The resulting precipitate consists essentially of pectin and starch and the ratio of starch to pectin may vary in apple pectin extract, for example, from 1 to 9 to 1 to 4 depending on the degree of ripeness of the apples. Such a product is by no means a pure pectin and the presence of starch in it is not desirable. Starch has no function in jelly making; it dilutes the pectin by its presence in the finished product and is apt to cause cloudiness in jellies.

In its broadest sense my invention comprises a method of producing a dry pectin devoid of starch and prepared by heating the fruit to obtain the pectin in solution, converting the starch in the solution to water-alcohol soluble substances by means of a diastatic enzyme and then precipitating the pectin from the solution by alcohol and drying the precipitate.

By converting the starch into products soluble in the alcoholic mother liquor, I can precipitate the pectin with alcohol without contaminating it with starch.

Concentration of the starch-free pectin extract preliminary to alcohol precipitation is desirable for commercial practice to reduce tankage volume required for the precipitation; also to reduce the amount of alcohol used. Further pectin in concentrated solution can be precipitated as described below in a fibrous condition which is readily collected, pressed and handled, while pectin in dilute solution precipitates as a finely divided gelatinous precipitate which it is difficult to collect and press.

This starch-free pectin concentrate may be obtained by the processes described in my U. S. Patents Nos. 1,082,682 and 1,235,666.

The method of alcohol precipitation is very important. I have discovered that if the alcohol is added to the pectin concentrate a very thick, jelly-like mass results which is difficult to stir and break up and which occludes mother liquor tenaciously. However, if the pectin concentrate is added slowly in fine streams to the alcohol with constant stirring, the mass remains fluid and is easily stirred and broken up and a fibrous precipitate results which is easily pressed. I have found that concentrated pectin solutions can be delivered through orifices as small as .005 inch in diameter, and it is desirable with such fine orifices to warm the pectin concentrate slightly, say, to 120° F., preliminary to adding it to the alcohol at room temperature.

The method of alcohol precipitation I employ is to add the pectin concentrate to 1 or more volumes of 95% ethyl alcohol, which may be suitably denatured, the concentrate being delivered in fine streams under the surface of the alcohol which is constantly stirred. With moderate stirring the operation of precipitation is finished in about 10 minutes and the mother liquor then removed. It is not desirable to agitate faster than is necessary for thorough mixing, or longer than is required to add the pectin concentrate, as otherwise the fibrous precipitate is broken up so that it cannot be so completely freed from mother liquor by pressing, for example, in a hydraulic or screw press. I have found that the precipitate thus obtained, if dried after pressing, is of a hard horny nature, difficult to grind and slow to dissolve. However, I have discovered that by taking the pressed precipitate, shredding and soaking it several hours with sufficient 95% alcohol to cover it and then repressing and drying, I obtain a pectin which is brittle and friable, easily ground, and dissolves much more quickly in water. This latter condition is due to the dehydration of the pectin by the additional alcohol which removes the water which affects the character of the pectin precipitate on drying.

This method of alcohol precipitation is applicable to pectin concentrates made not only from starchy fruits such as apples, but also from citrus fruits e. g. lemons and oranges.

I claim as my invention:

1. The process of preparing pectin from fruits comprising removing the natural sugar therefrom, processing the remaining pulp in the presence of a solvent to obtain the pectin in solution, converting the starch in the solution by the action of a suitable diastatic enzyme, concentrating the resultant solution and adding the concentrate to alcohol with stirring, dehydrating the precipitate and then drying it.

2. The process of preparing pectin from a pectin concentrate comprising adding said concentrate to one or more volumes of alcohol with constant stirring, separating the resulting precipitate from the mother liquor and then dehydrating the precipitate with more alcohol and finally drying the precipitate.

3. The process of preparing pectin from a pectin concentrate comprising adding said concentrate in fine streams to one or more volumes of alcohol below the surface of the latter, continuously stirring the alcohol, separating the resultant precipitate from the mother liquor, dehydrating the precipitate with more alcohol and finally drying the precipitate.

4. The process of preparing pectin from fruits comprising releasing the pectin into solution by heating, converting the starch in the solution to water-alcohol soluble substance by means of a suitable diastatic enzyme, concentrating the resultant solution and adding the concentrate to alcohol with stirring, dehydrating the precipitate and then drying it.

ROBERT DOUGLAS.